US008653414B2

(12) United States Patent
Long et al.

(10) Patent No.: US 8,653,414 B2
(45) Date of Patent: Feb. 18, 2014

(54) WIRELESS FOOT PEDAL CONTROLLER FOR WELDING SYSTEM

(75) Inventors: Michael A Long, Springfield, IL (US); Hermann Brian Falter, Calgary (CA); Hans Noack, Wood Dale, IL (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/165,747

(22) Filed: Jun. 21, 2011

(65) Prior Publication Data

US 2011/0248009 A1 Oct. 13, 2011

Related U.S. Application Data

(63) Continuation of application No. 12/113,719, filed on May 1, 2008, now abandoned.

(51) Int. Cl.
*B23K 9/10* (2006.01)

(52) U.S. Cl.
USPC .......................................................... 219/132

(58) Field of Classification Search
USPC ...................... 219/132; 248/647, 463; 74/460
See application file for complete search history.

(56) References Cited

U.S. PATENT DOCUMENTS

| | | | | |
|---|---|---|---|---|
| 2,986,953 | A * | 6/1961 | De Armond Harry et al. | 74/478 |
| 5,247,449 | A * | 9/1993 | Yoshida | 700/136 |
| 5,535,642 | A * | 7/1996 | Moll | 74/561 |
| 5,793,016 | A * | 8/1998 | Colling et al. | 219/132 |
| 5,948,518 | A * | 9/1999 | Lucke et al. | 428/297.4 |
| 6,016,248 | A * | 1/2000 | Anzai et al. | 361/679.59 |
| 6,420,680 | B1 * | 7/2002 | Samodell | 219/132 |
| 6,531,673 | B2 * | 3/2003 | Fedorcak | 219/74 |
| 2005/0219062 | A1 * | 10/2005 | Van Bosch et al. | 340/825.72 |

* cited by examiner

*Primary Examiner* — Henry Yuen
*Assistant Examiner* — Ayub Maye
(74) *Attorney, Agent, or Firm* — Perkins Coie LLP

(57) ABSTRACT

A wireless controller (14) comprises a housing including a first portion (20*a*) and a second portion (20*b*) moveably attached to the first portion (20*a*). The first portion (20*a*) supports the controller (14) relative to an external surface and is adjustable between an elevated position and a collapsed position, wherein a first end of the first portion (20*a*) is elevated relative to a second end of the first portion (20*a*) when the first portion is in the elevated position. A sensing element (22) senses a position of the second portion (20*b*) relative to the first portion (20*a*) and provides a corresponding position signal. A transmitter (24) is coupled with the sensing element (22) and wirelessly transmits the position signal.

20 Claims, 11 Drawing Sheets

WIRELESS FOOT PEDAL CONTROLLER FOR WELDING SYSTEM

This application is a continuation of U.S. application Ser. No. 12/113,719, filed May 1, 2008, of which is herein incorporated by reference in its entireties.

BACKGROUND

1. Field

Embodiments of the present invention relate to methods and apparatuses for controlling welding systems. More particularly, various embodiments of the invention provide methods and apparatuses for wirelessly controlling welding systems with remote foot pedals.

2. Description of Related Art

Welding systems, such as tungsten inert gas (TIG), metal inert gas (MIG), and shielded metal arc (SMAW) welding systems, may be controlled by foot pedals to enable operators to vary welding parameters. Typically, foot pedals are difficult to interface with welding systems or are connected to welding systems by cables—thereby inhibiting operator movement and pedal use.

Accordingly, there is a need for an improved controller for welding systems that does not suffer from the problems and limitations of conventional systems.

SUMMARY OF THE INVENTION

The present teachings provide an improved apparatus for controlling welding systems that does not suffer from the limitations of the prior art. Particularly, embodiments of the present technology provide a method and apparatus for wirelessly controlling welding systems with remote foot pedals.

According to a first embodiment of the invention, a wireless controller comprises a housing including a first portion and a second portion moveably attached to the first portion. The first portion supports the controller relative to an external surface and is adjustable between an elevated position and a collapsed position, wherein a first end of the first portion is elevated relative to a second end of the first portion when the first portion is in the elevated position. A sensing element senses a position of the second portion relative to the first portion and provides a corresponding position signal. A transmitter is coupled with the sensing element and wirelessly transmits the position signal.

According to a second embodiment of the invention, a wireless controller comprises a housing with a base portion and a pivoting portion pivotable relative to the base portion, a rotary potentiometer for providing a position signal, and a pinion coupled with the rotary potentiometer. A rack is in intermeshing engagement with the pinion and in sliding engagement with the pivoting portion of the housing, and a spring element biases the rack against the pivoting portion of the housing. A transmitter is coupled with the potentiometer for wirelessly transmitting the position signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Preferred implementations of the present technology are described in detail below with reference to the attached drawing figures, wherein.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 9:
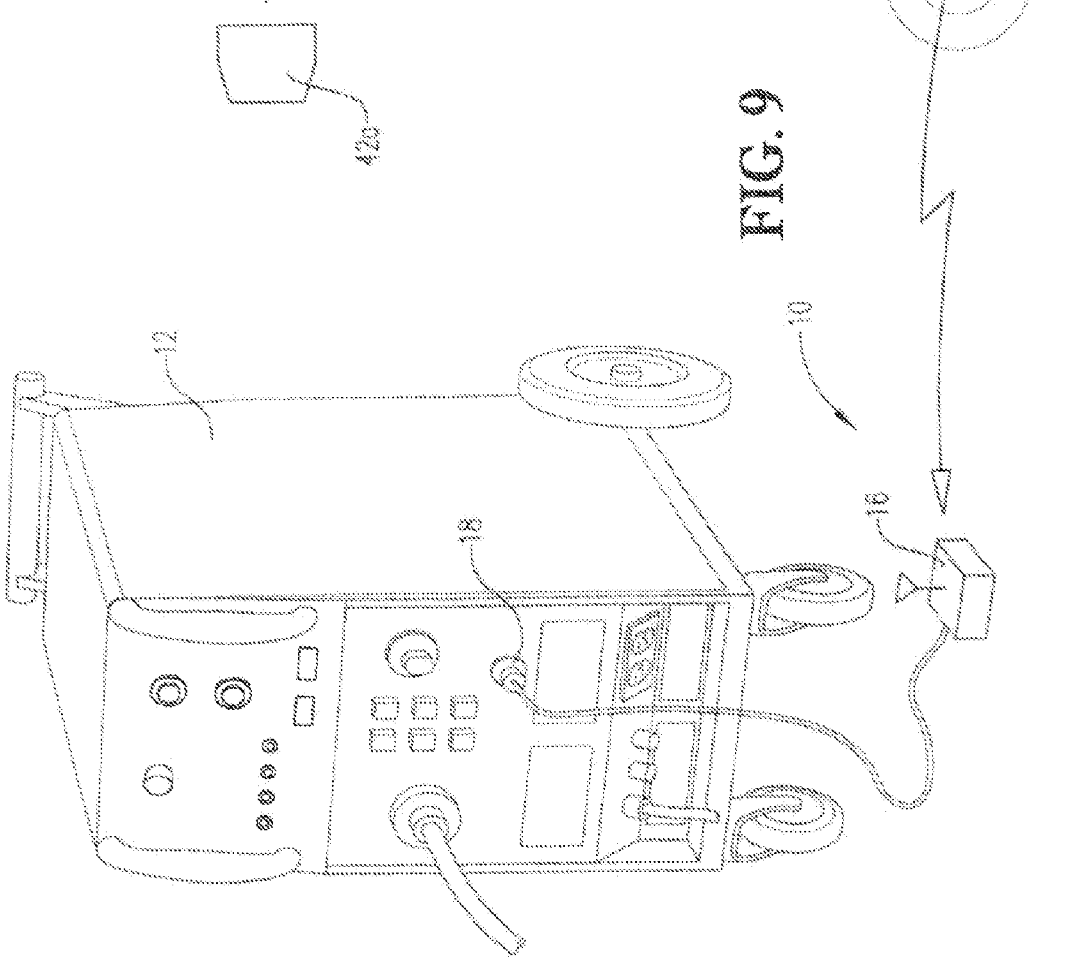
FIG. 9 is an environmental view of the foot pedal of FIGS. 1-5 and receiver of FIG. 7 being associated with a welding system.

Referring initially to FIG. 9, various embodiments of the present invention provide a wireless control system 10 operable to control one or more functions of a welding system 12. The control system 10 may include a foot pedal 14 operable to wirelessly transmit a pedal position signal to a receiver 16. The receiver 16 is operable to connect with an electrical control interface 18 associated with the welding system 12 to enable the welding system 12 to be wirelessly controlled through operation of the foot pedal 14.

The welding system 12 may be any welding system including the electrical control interface 18 to enable the reception of an electrical signal for control of one or more functions of the welding system 12. For example, the welding system 12 may be a tungsten inert gas (TIG), metal inert gas (MIG), and/or shielded metal arc (SMAW) welding system. In some embodiments, the welding system 12 is a TIG system and the electrical control interface 18 is an amperage control interface operable to receive a control signal to vary the output current of the welding system 12. For example, the welding system 12 may be a Syncrowave(R) 350 LX TIG/STICK welding system manufactured by Miller Electric Mfg Co. including the electrical control interface 18 to couple with a cable associated with a control device such as a wired foot pedal. Thus, the control system 10 may be adapted to replace a wired foot pedal associated with the welding system 12. However, the control system 10 may be adapted to control any function of any welding system having an electrical control interface.

Referring to FIGS. 1-3 and 6, the foot pedal 14 may include a pivotable housing 20, a sensing element 22 coupled with the pivotable housing 20, and a transmitter 24 coupled with the sensing element 22. The sensing element 22 is operable to sense a position of the pivotable housing 20 and provide a corresponding pedal position signal, and the transmitter 24 is operable to wirelessly transmit the pedal position signal for reception by the receiver 16. The various elements of the foot pedal 14 may be discrete elements coupled together utilizing wired or wireless connections. In some embodiments, portions of the foot pedal 14, such as the sensing element 22 and transmitter 24, may be integral.

Figure 2:
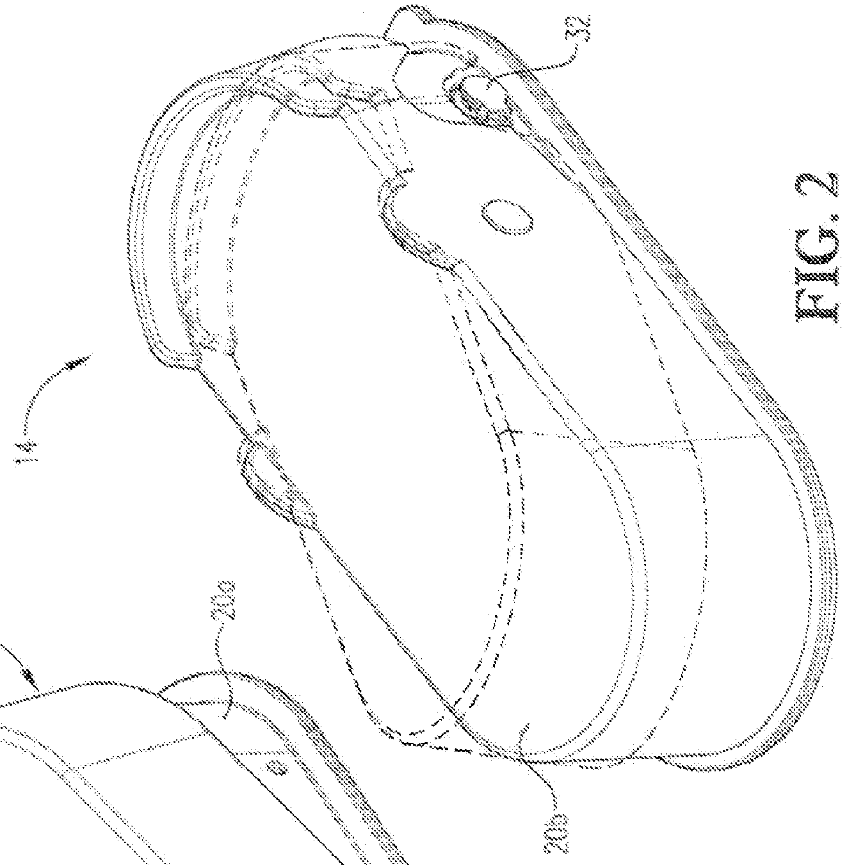
FIG. 2 is a top perspective view of the foot pedal of FIG. 1, illustrating movement of a pivoting portion of the pedal relative to a base portion of the pedal.
Figure 5:
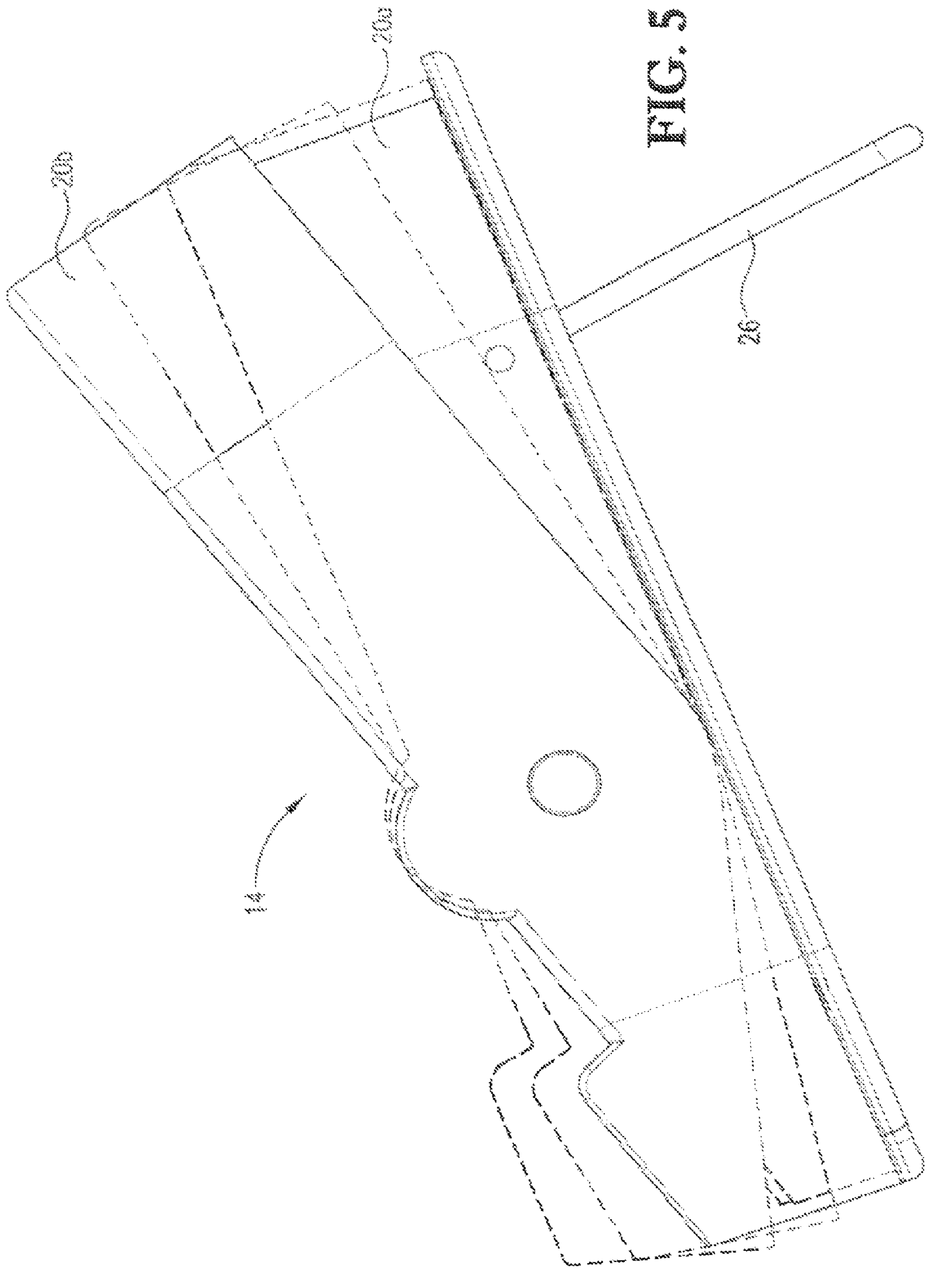
FIG. 5 is a side elevation view of the foot pedal of FIG. 1, illustrating the elevator element deployed and supporting the foot pedal controller in an elevated position.

As best illustrated in FIGS. 2 and 5, the pivotable housing 20 is operable to be at least partially pivoted by an operator to generate the pedal position signal for use by the receiver 16. In some embodiments, the pivotable housing 20 may include a base portion 20*a* and a pivoting portion 20*b*. The base portion 20*a* may be configured to remain stationary, even when the pivoting portion 20*b* is pivoted, such as by including or utilizing weights, flared surfaces, anti-skid elements, surface fasteners, coupling elements, combinations thereof, and the like. The base portion 20*a* may also be adapted to house various elements associated with the foot pedal 14, such as the sensing element 22 and transmitter 24.

Other housing configurations may be employed without departing from the scope of the present teachings. By way of example, principles of the present teachings may be incorporated into virtually any housing configuration involving a first portion and a second portion moveable relative to the first portion.

In some embodiments, the base portion 20*a* includes an elevator element 26 operable to raise a portion of the housing 20 to facilitate pivoting of the pivoting portion 20*b*. For example, the elevator element 26 may include a U-shaped bracket that is operable to pivot between a stowed position and a deployed position. In the deployed position, the elevator element 26 engages an external surface, such as a floor, and supports a first end of the housing 20 in an elevated position relative to a second end of the housing 20 (see FIG. 5). In the stowed position, the elevator element 26 is within a recess in the bottom of the base portion 20*a* and separated from the external surface by a space, thereby allowing the housing 20 to rest on the external surface in a collapsed position.

The elevator element 26 may be adjustable between the stowed position and a plurality of deployed positions, wherein each deployed position corresponds to a unique elevated position of the foot pedal 14. By way of example, multi-position adjustability may be accomplished using an adjustable A-frame configuration, a ratcheting mechanism, a plurality of detents, and so forth.

It will be appreciated that the elevator element 26 is generally operable to adjust the foot pedal 14 between one or more elevated positions and the collapsed position, and is not limited to a particular shape or size disclosed herein. By way of example, the elevator element 26 may include one or more telescoping members operable to be selectively extended to any of various positions corresponding to different heights of the foot pedal 14.

Figure 1:
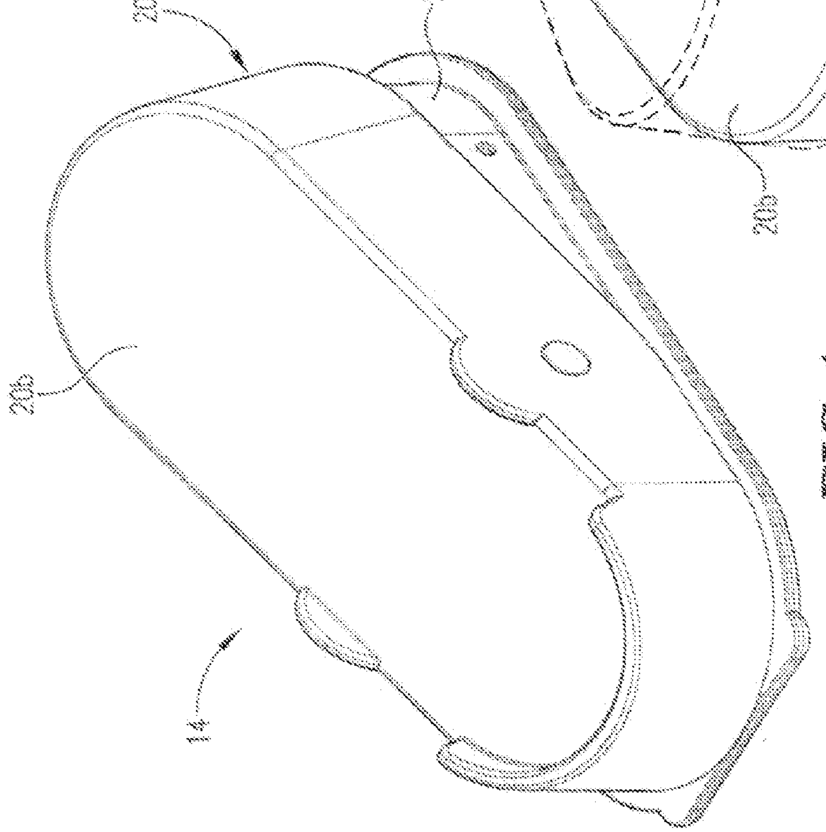
FIG. 1 is a top perspective view a foot pedal for use in a wireless welding control system.
Figure 3:
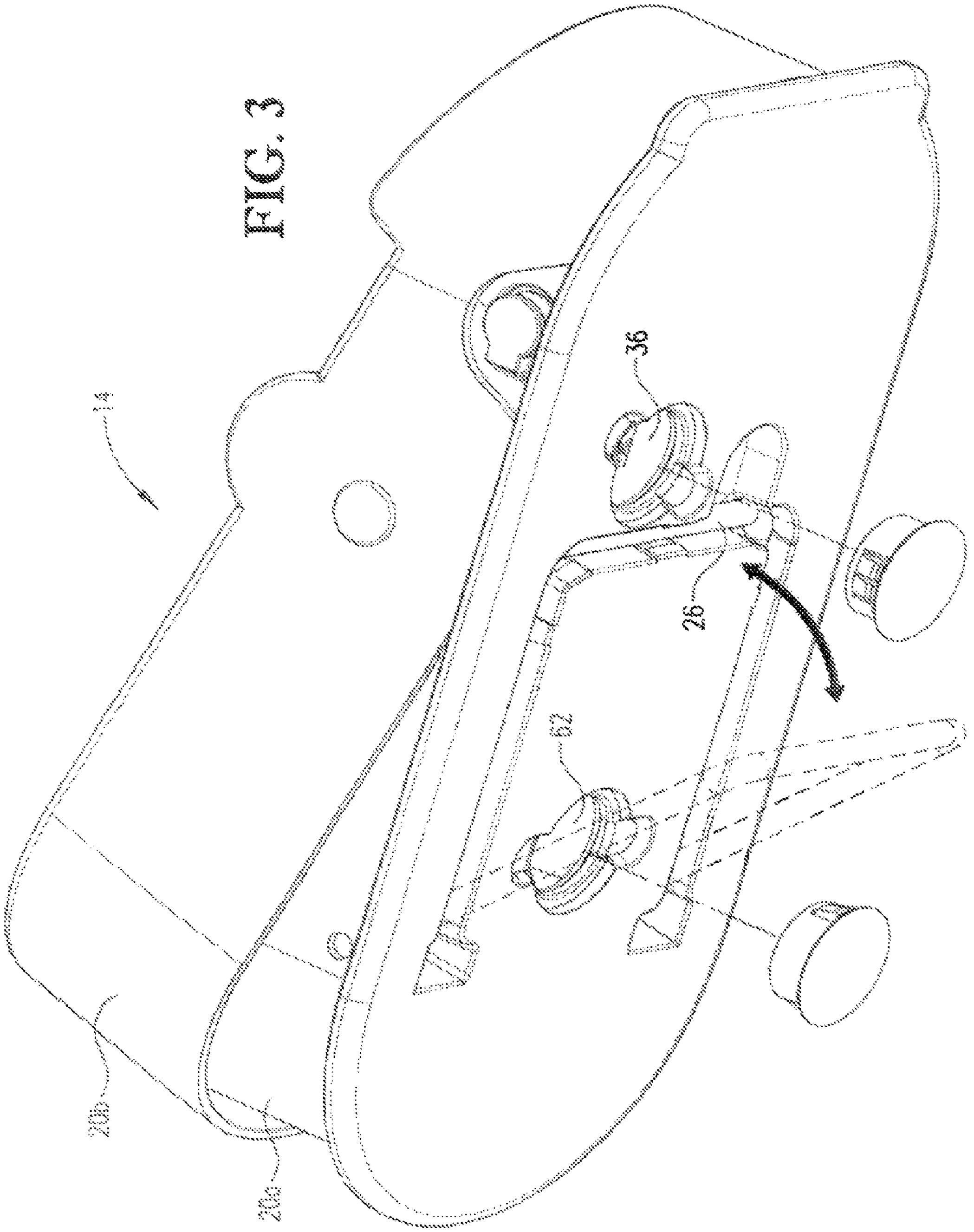
FIG. 3 is a bottom perspective view of the foot pedal of FIG. 1, illustrating an elevator element in a stowed position relative to the base portion of the foot pedal and further illustrating a pair of access port caps separated from respective access ports.
Figure 4:
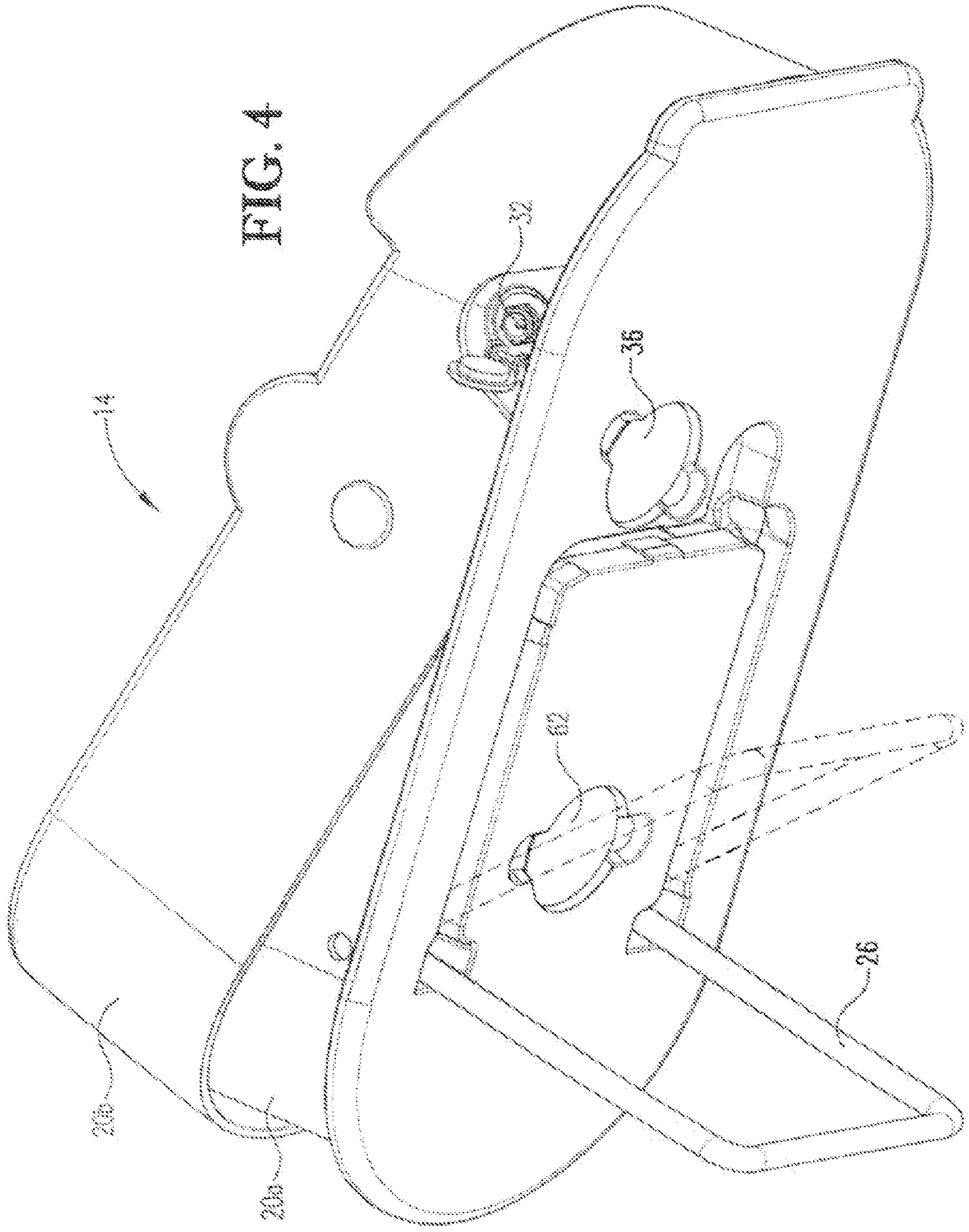
FIG. 4 is a bottom perspective view of the foot pedal of FIG. 1, illustrating the elevator element in a deployed position relative to the base portion of the foot pedal and further illustrating the pair of access port caps seated in the access ports.

If a user is operating the welding system 12 while lying on his or her back under a vehicle, it may be difficult and/or uncomfortable to operate the foot pedal 14 if the foot pedal 14 is lying flat on the ground (in the collapsed position, FIGS. 1 and 2). In such a scenario, the user's knees would likely be elevated such that the user's upper and lower legs form a forty-five degree angle, limiting the comfortable pivoting range of the foot and ankle. In other words, the user's lower leg would most likely be angled away from the foot pedal 14, requiring the user to extend the top of his or her foot beyond a natural or comfortable position in order to pivot the pivoting portion 20*b* relative to the base portion 20*a*. If the foot pedal 14 is in the elevated position, however, as illustrated in FIG. 5, the pivoting portion 20*b* more closely matches the natural position of the user's foot.

The pivoting portion 20*b* is pivotably coupled with the base portion 20*a* and is operable to be at least partially pivoted by the operator. For example, the operator may press on a portion of the pivoting portion 20*b* to pivot the pivoting portion 20*b* in relation to the base portion 20*a*. In some embodiments, the base portion 20*a* may present a generally oval shape or a generally rectangular configuration with rounded ends and/or corners, and the pivoting portion 20*b* may be at least partially beveled to enable the pivoting portion 20*b* to easily pivot in relation to the base portion 20*a*. However, the pivotable housing 20 may present any configuration that is operable to be at least partially pivoted or otherwise depressed by the operator, including conventional configurations.

The pivotable housing 20 may be formed from various materials, including metals, plastics, combinations thereof, and the like. In some embodiments, the pivotable housing 20 may be comprised of aluminum, steel, or other similar materials to provide rigidity and stability. Alternatively, the pivotable housing 20 may be comprised of poly carbonate or other fiber materials to minimize interference with signals generated by the transmitter 24. Utilization of poly carbonate and other similar materials may reduce or eliminate the need for antennas external to the housing 20. In an exemplary implementation, the housing 20 is formed of a long fiber plastic material with a certain glass content for added durability without sacrificing signal transmission allowance. The amount of glass in the material may be within the range of about 10% to about 50% or within the range of about 20% to about 40%. More particularly, the amount of glass in the material may be about 25%, about 30%, or about 35%. By way of example, the housing 20 may be formed of LNP VERTON RF 700-10 EM HS or similar materials.

The sensing element 22 is coupled with the pivotable housing 20 and is operable to sense a position of the pivotable housing 20 and provide the corresponding pedal position signal. Thus, for example, the sensing element 22 may sense the extent to which the pivotable housing 20 has been pivoted by the operator, such as the amount the pivoting portion 20*b* has been pivoted in relation to the stationary base portion 20*a*, and provide the corresponding pedal position signal.

In some embodiments, the sensing element 22 may include a rotary potentiometer 26. The potentiometer 26 may be coupled with the pivotable housing 20 to rotate as the pivotable housing 20 pivots. As the potentiometer 26 rotates, the resistance it provides to a supplied current changes to produce the pedal position signal for transmission by the transmitter 24. The potentiometer 26 may be coupled with the pivotable housing 20 in any manner to rotate or otherwise actuate as the housing 20 is pivoted. For example, and as explained below in greater detail, the potentiometer 26 may be actuated via a rack and pinion assembly upon movement of the pivoting portion 20*b*.

In some embodiments, the potentiometer 26 may present a non-rotary configuration and additionally or alternatively include linear, spindle operated, panel mount, switched, multi-turn, multi-gang, sealed or unsealed potentiometers. Further, in some embodiments, the sensing element 22 may provide potentiometer-like functionality to detect the position of the pivotable housing 20 without including a potentiometer.

The sensing element 22 may additionally or alternatively include rotary encoders, piezoelectric sensors, Hall-effect sensors, inductive sensors, linear voltage detection transmitters, pressure transducers, infrared sensors, optical sensors, magnetic sensors, switches, rheostats, combinations thereof, and the like, to sense the position of the pivotable housing 20 and/or the extent to which the housing 20 is pivoted. Thus, the sensing element 22 may include any element or combination of elements operable to sense the position of the pivotable housing 20 and provide the corresponding pedal position signal. The pedal position signal provided by the sensing element 22 may be any analog and/or digital signal.

Figure 6:
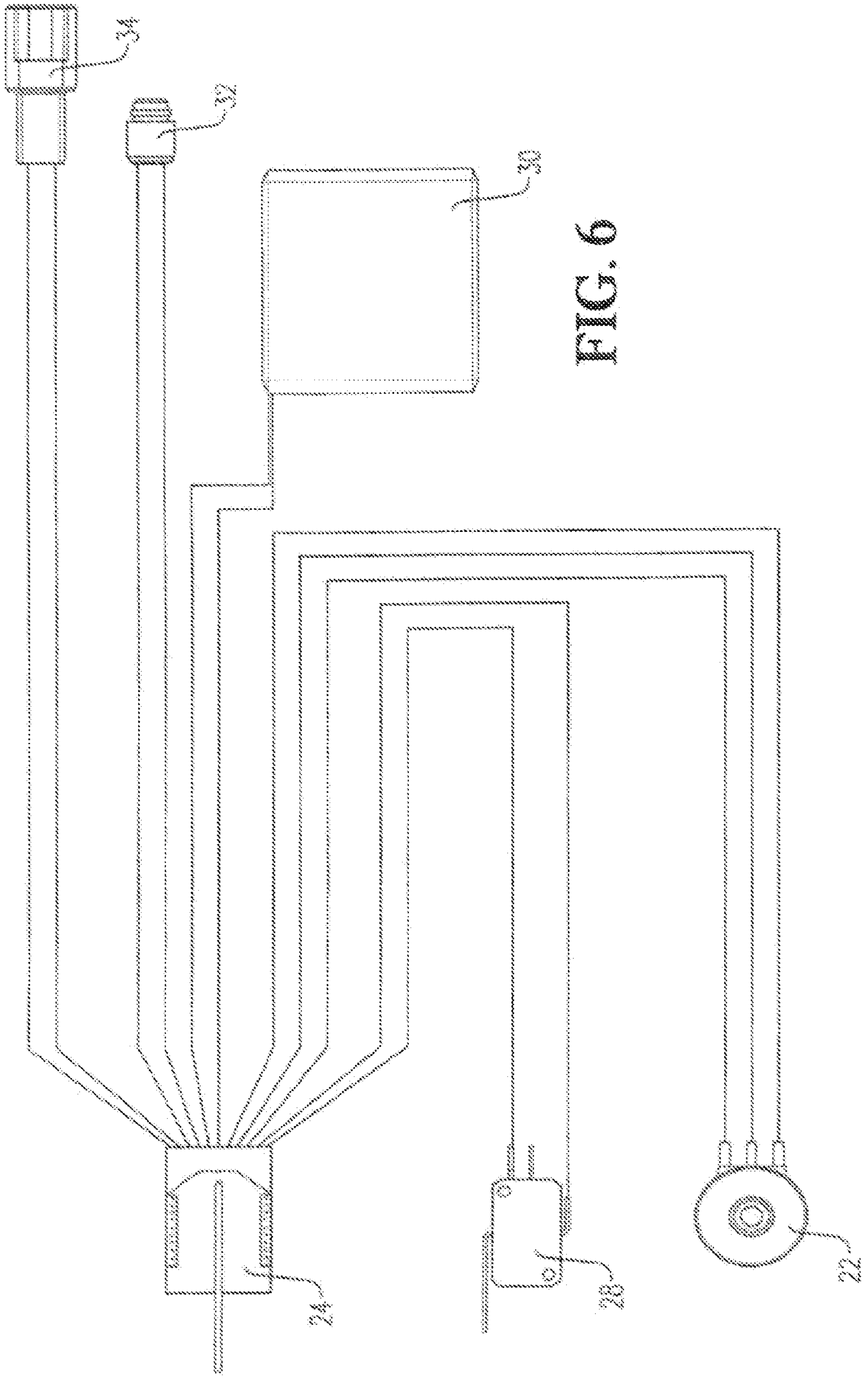
FIG. 6 is a schematic diagram of some components of the foot pedal controller of FIG. 1.
Figure 10:
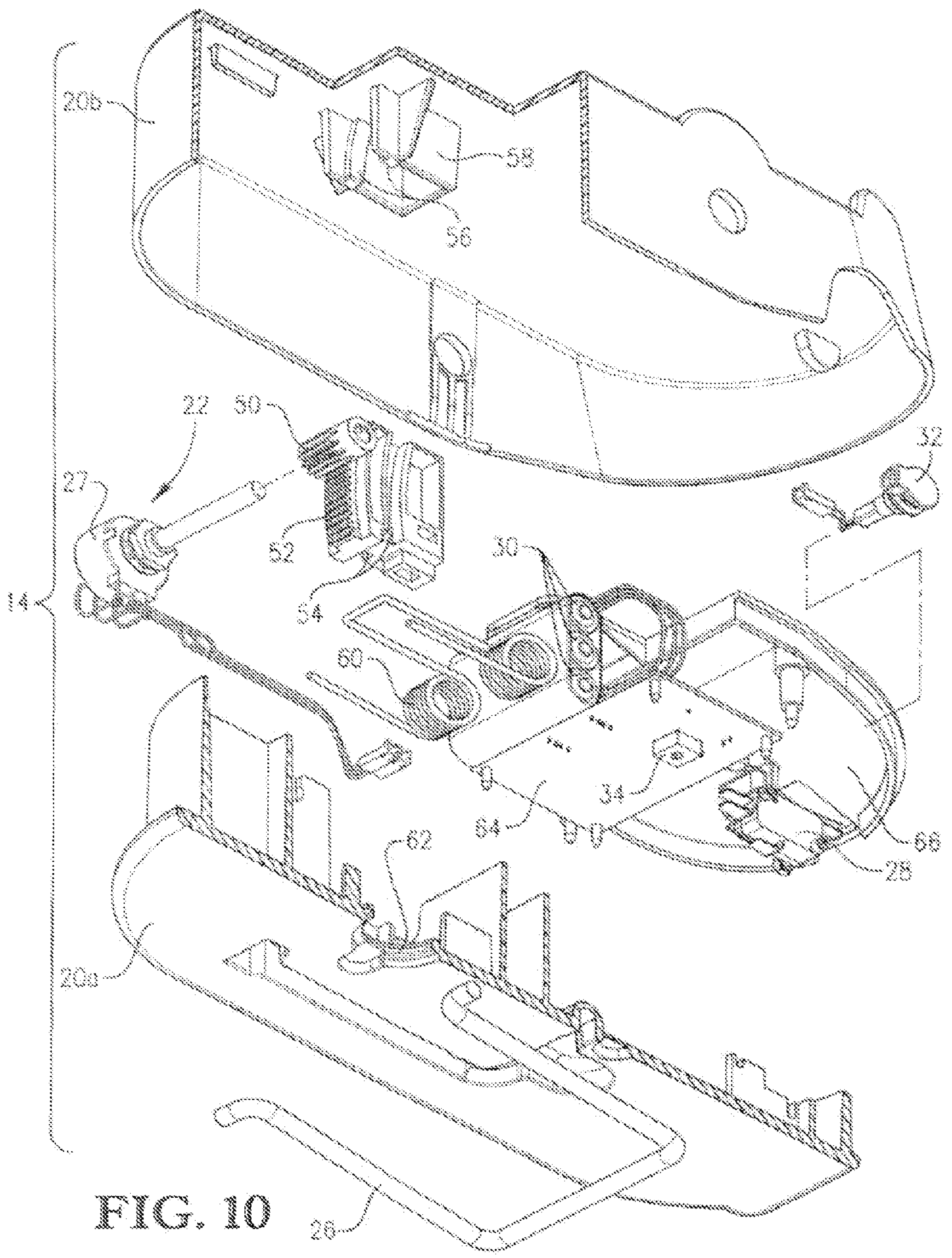
FIG. 10 is an exploded view of the foot pedal of FIGS. 1-5.
Figure 11:
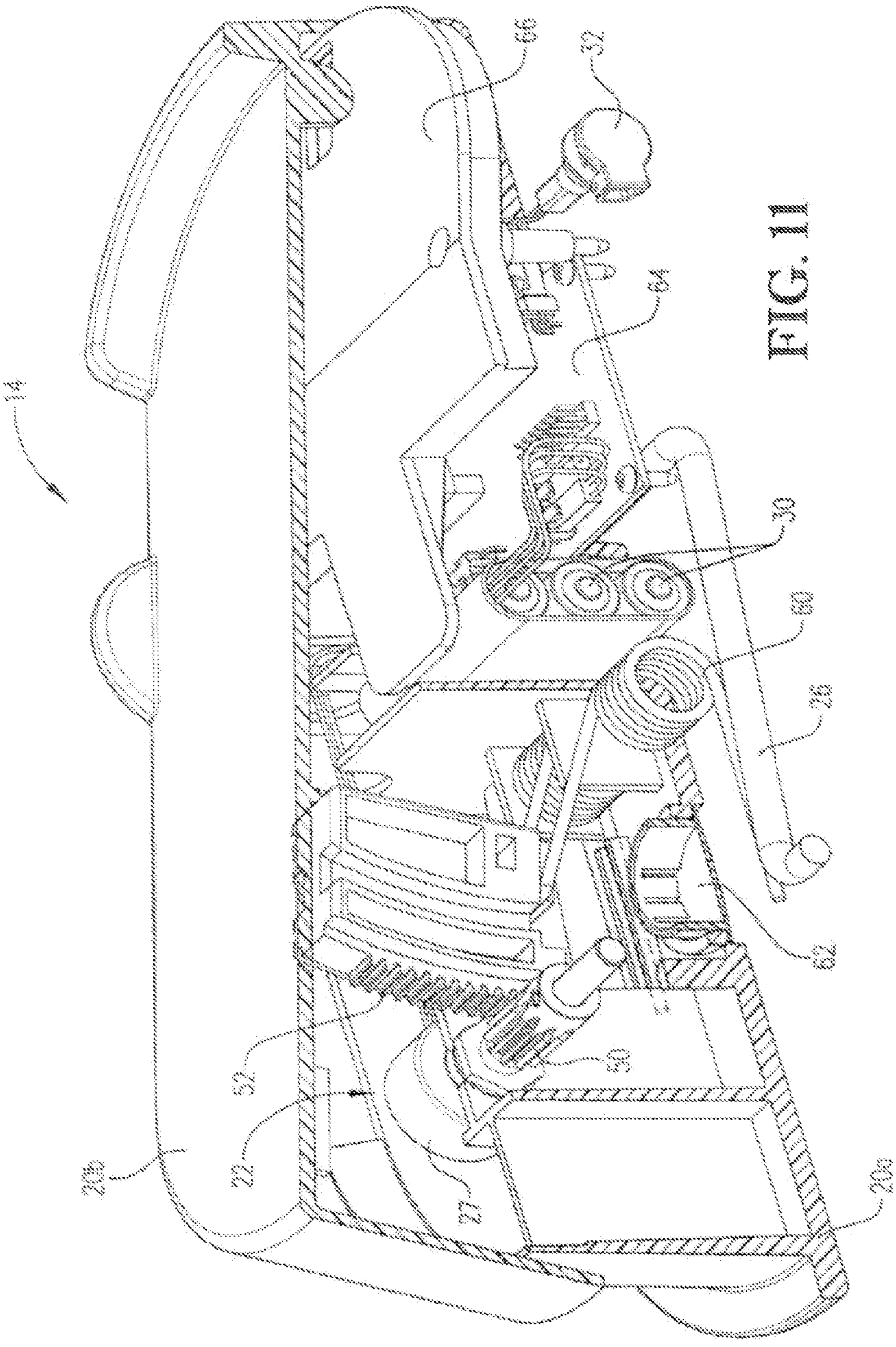
FIG. 11 is a sectional view of the foot pedal of FIGS. 1-5 illustrating the pivoting portion in a first position relative to the base portion.
Figure 13:
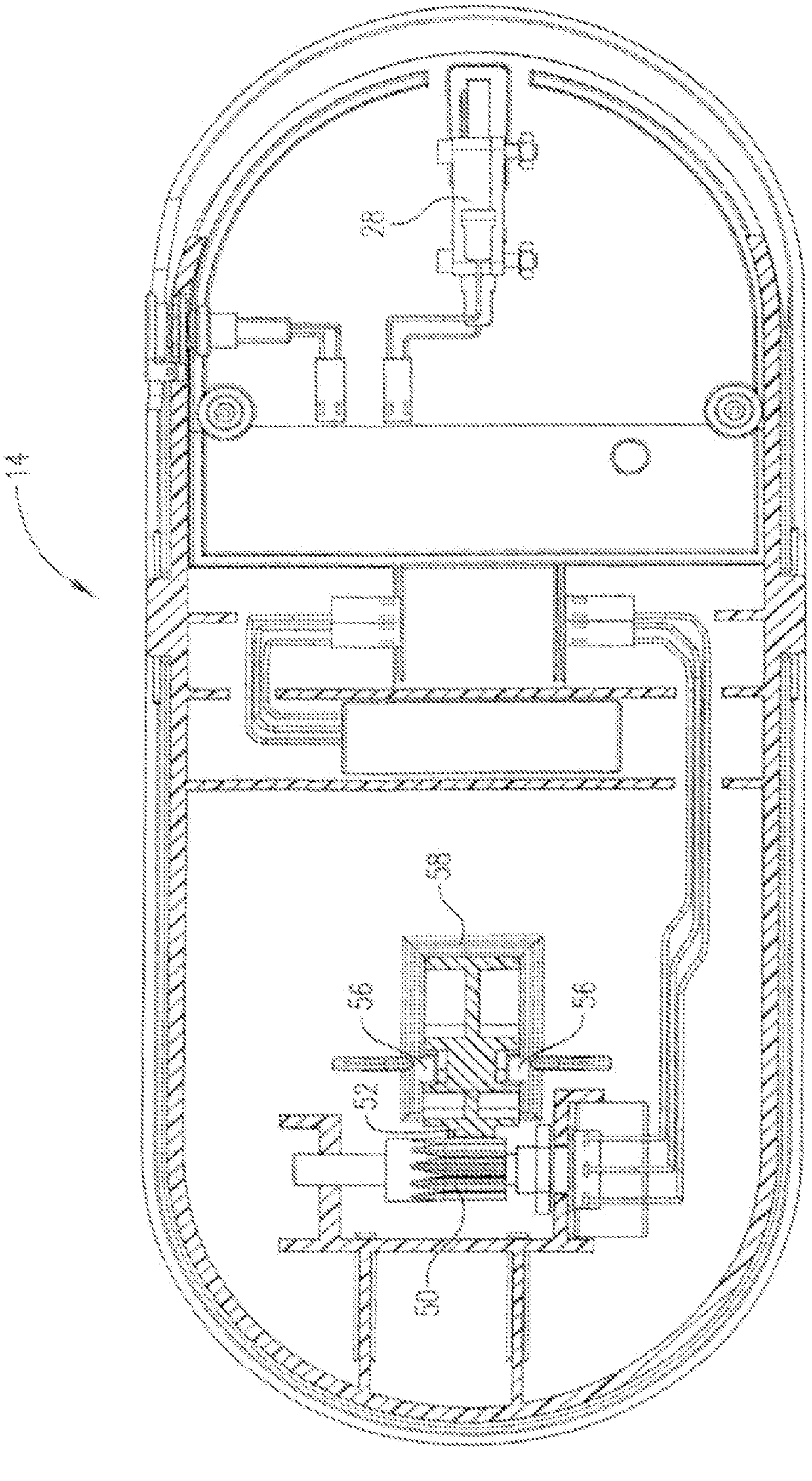
FIG. 13 is a bottom sectional view of the foot pedal of FIGS. 1-5.

As illustrated in FIGS. 6, 10 and 13, in some embodiments, the foot pedal 14 may also include a limit switch 28 separate from the sensing element 22. The limit switch 28 is operable to be functioned when the pivotable housing 20 is at least partially pivoted and provide a corresponding signal. Thus, the limit switch 28 may detect when the pivotable housing 20 is not being pivoted by the operator (i.e., when the housing 20 is at rest) and when the pivotable housing 20 is being pivoted by the operator (i.e., when the housing 20 is not at rest). For example, the limit switch 28 may be associated with a contact connected to the pivoting portion 20*b* of the housing 20 such that as the pivoting portion 20*b* pivots, the contact moves away from the limit switch 28 to enable the limit switch 28 to close and provide a corresponding signal indicating that the pivotable housing 20 has been pivoted by the operator.

The foot pedal 14 may include an integral power source 30 to power the transmitter 24 and/or other components to enable the foot pedal 14 to operate without any external wires. The power source 30 may comprise one or more batteries, a battery pack, a receptacle for receiving one or more batteries or a battery pack, a solar cell, combinations thereof, and the like. In some embodiments, the power source 30 may be rechargeable and be associated with a charging port to receive electrical power for recharging from an external device or system, such an electrical outlet.

The transmitter 24 is coupled with the sensing element 22 and operable to wirelessly transmit the pedal position signal provided by the sensing element 22 for reception by the receiver 16. The transmitter 24 may include any element or combination of elements operable to wirelessly transmit the pedal position signal, including processors and antennas, for reception by the receiver 16. For example, the transmitter 24 can include radio and/or infrared transmitting elements. The transmitter 24 may additionally include other elements to facilitate coupling with the sensing element 22. For example, the transmitter 24 may include or be coupled with an analog-to-digital converter, digital-to-analog converter, and other signal processing elements. In some embodiments, portions of the transmitter 24, such as the antenna, may be positioned outside of the pivotable housing 20 to facilitate signal transmission. However, in other embodiments, the transmitter 24 may be entirely enclosed by the pivotable housing 20.

In some embodiments, the transmitter 24 may include a digital radio transmitter, such as a ZigBee-compliant (IEEE 802.15.4) transmitter operable to encode the pedal position signal into a plurality of digital packets. For example, the transmitter 24 may include an XBee radio module manufactured by MaxStream, Inc. of Lindon, Utah. However, other methods may be utilized by the transmitter 24 to transmit signals, including Bluetooth, WiFi, ultra wide-band, Wi-Max, frequency and/or amplitude modulation, combinations thereof, and the like. The transmitter 24 may be adapted to transmit digital signals, analog signals, and/or a combination of digital and analog signals. In some embodiments, the effective communication range between the transmitter 24 and receiver 16 may controlled by varying the output power of the transmitter 24.

In embodiments including the limit switch 28, the transmitter 24 may be coupled with both the sensing element 22 and limit switch 28. In such embodiments, the transmitter 24 is operable to transmit the pedal position signal in a manner that corresponds to the signals provided by the sensing element 22 and transmitter 24. For example, the potentiometer 26 can provide a potentiometer position signal, the limit switch 28 can provide a limit switch position signal, and the transmitter 24 can transmit the pedal position signal in a manner that reflects both the potentiometer and limit switch signals.

Further, the transmitter 24 may also be coupled with the power source 30 and transmit the pedal position signal with an indication of the status of the power source 30, such as battery level. Thus, the pedal position signal transmitted by the transmitter 24 may indicate the position of the potentiometer 26, the status of the limit switch 28, and the status of the power source 30. However, the pedal position signal may only indicate the position of the pivotable housing 20 as sensed by the sensing element 22 in some embodiments.

The pedal position signal may also identify and/or authenticate the operator. For example, the operator may fully depress the pivotable housing 20 three times, or in any other unique sequence, to cause the transmitter 24 to transmit the pedal position signal with an identification and/or authentication of the operator. Such identification can be used by the transmitter 24, receiver 16, and welding system 12 to automatically provide configuration settings previously set by the operator in the event the control system 10 and welding system 12 are used by more than one operator. The foot pedal may also include one or more interface elements 32, such as connectors, buttons, switches, and the like. The interface element 32 may include an electrical communications connector, a power connector for energizing the pedal 14 and/or charging the power source 30. Furthermore, the interface element 32 may include a button or switch for turning the foot pedal 14 off and on, and/or for identification and authentication purposes.

In embodiments where the pedal position signal indicates more than the position of the pivotable housing 20, use of digital radio methods to transmit the signal may be desirable to limit the amount of communication required between the foot pedal 14 and receiver 16. For example, a single digital radio packet may indicate: one or more positions of the pivotable housing 20 as sensed by potentiometer 26; the status of the limit switch 28; the status of the power source 30; the identity of the operator; and/or various communication information such as the identity of the transmitter 24 and the channel being utilized by the control system 10.

In some embodiments, the transmitter 24 may be reprogrammed by the operator to modify the manner in which the pedal position signal is transmitted. For example, the foot pedal 14 may include a transmitter programming interface 34, such as a USB, RS-232, or other wired or wireless data interface, associated with the transmitter 24 to enable the operator to reprogram and/or otherwise communicate with the transmitter 24. The transmitter programming interface 34 may further include one or more buttons, knobs, or switches, such as a rotary encoder or a series of DIP switches, for frequency adjustment or otherwise enabling a user to directly control one or more functions of the transmitter 24. For instance, the transmitter 24 may be programmed to process, adjust, or otherwise modify the pedal position signal before transmission to the receiver 16, such as by modifying the minimum and maximum values to be provided to the welding system 12. The transmitter programming interface 34 may be accessible via a first access port 36.

In some embodiments the potentiometer 26 may provide a linear (direct) relationship between its output and the position of the pivotable housing 20—such as by providing a 0% output when the pivotable housing 20 has not moved and a 100% output when the pivotable housing 20 is fully depressed. Such a linear relationship may not be desirable in all environments and the transmitter 24 may be programmed to scale the signal provided to the potentiometer 26 to more desirable levels—such as by correlating the maximum position indicated by the pedal position signal to where the pivotable housing 20 is depressed only 80% as sensed by the potentiometer 26. The receiver 16 may additionally or alternatively perform this functionality.

The transmitter 24 may also be programmed with a unique identifier, channel information, network information, and/or other communication information to enable the transmitter 24 and receiver 16 to communicate with limited interference from other devices. For example, in some embodiments, the foot pedal 14 may be one of several remote devices associated with the welding system 12 and the communication information enables the transmitter 24 and receiver 16 to communicate without significantly interfering with the other remote devices. Further, the foot pedal 14 may be associated with several welding systems 12 to separately or simultaneously control their functionality.

In some embodiments, the foot pedal 14 may be configured for a sleep mode to extend the life of the power source 30. For example, if the sensing element 22 and/or limit switch 28 detect that the pivotable housing 20 has not been depressed for a certain time period, the foot pedal 14 may enter a sleep mode to only periodically utilize the sensing element 22. The configuration of the sleep mode may be varied by utilizing the transmitter programming interface 34, such as by defining when and if the sleep mode should be utilized and the various sleep and wake time periods utilized by the sleep mode.

Figure 7:
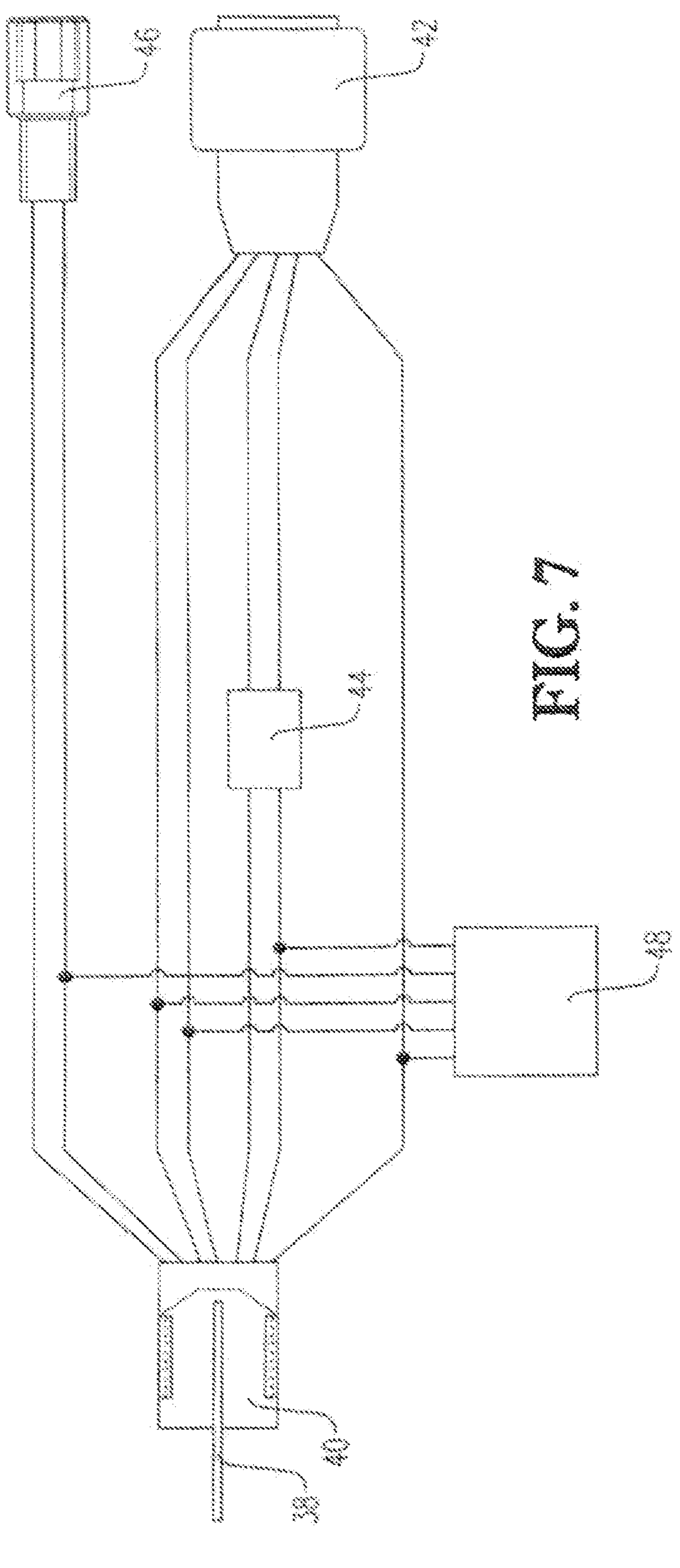
FIG. 7 is a schematic diagram of some components of a receiver configured in accordance with various embodiments of the present invention.
Figure 8:
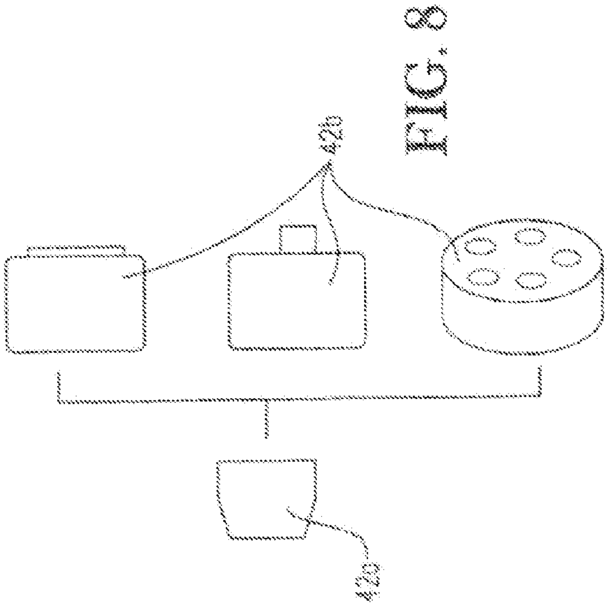
FIG. 8 is a schematic view of a connector operable to be utilized by the receiver of FIG. 7.

Referring to FIGS. 7-9, the receiver 16 is operable to receive signals transmitted by the transmitter 24 and couple with the electrical control interface 18 of the welding system 12 to control the welding system 12 based on the received signals. The receiver 16 may include an antenna 38 operable to wirelessly receive signals transmitted by the transmitter 24, a processor 40 coupled with the antenna 38 that is operable to process received signals, and a connector 42 coupled with the processor 40 that is operable to connect with the electrical control interface 18 to provide processed signals thereto. The various elements of the receiver 16 may be discrete elements coupled together utilizing wired or wireless connections. In some embodiments, portions of the receiver 16, such as the antenna 38 and processor 40, may be integral.

The antenna 38 may be any element or combination of elements operable to receive signals transmitted by the transmitter 24. In embodiments where the transmitter 24 transmits radio frequency signals, the antenna 38 may include a radio frequency antenna and associated circuitry. For example, the antenna 38 may be matched with the transmitter 24 to ensure the proper reception of signals. In embodiments where the transmitter 24 transmits infrared signals, the antenna 38 may be an infrared detector (photodetector). Thus, the antenna 38 is not necessarily limited to receiving radio frequency signals using one or more conductive elements. The antenna 38 may be internal to the receiver housing and/or be an external antenna operable to couple with the receiver 16.

In some embodiments, the receiver 16 may include a relay 44 coupled with the processor 40 and connector 42. The relay 44 is operable to switch when controlled by the processor 40 to mimic the functionality of the limit switch 28, as is discussed in more detail below. The relay 44 may include any controllable switches operable to be controlled by the processor 40, including latching relays, reed relays, polarized relays, machine tool relays, solid state relays, combinations thereof, and the like.

The processor 40 is coupled with the antenna 38 and operable to process signals for use by the welding system 12, such as by converting the signal into an appropriate format for reception by the electrical control interface 18 and use by the welding system 12. For example, the pedal position signal may be an encoded digital radio signal and the processor 40 may decode the digital radio signal to generate an analog ratio metric signal for use by the welding system 12.

The processed pedal position signal provided to the welding system 12 may be a digital and/or an analog signal. For example, the processor 40 may include various switching elements and/or logic to present the processed pedal position signal as a variable voltage signal, a variable current signal, a variable resistance signal, a pulse-width modulated (PWM) signal, an unencoded digital signal, an encoded digital signal, combinations thereof, and the like.

The processor 40 may also scale the pedal position signal into a voltage or current range acceptable for use by the welding system 12. For example, the welding system 12 may require a 0-10V signal to be provided through the electrical control interface 18 to control welding current. If the amplitude to the pedal position signal received by the receiver 16 is not within this range, the processor 40 may scale (e.g., amplify) the pedal position to the appropriate range. Such a configuration enables the receiver 16 to be adapted to universally couple with any welding system 12 and electrical control interface 18 to provide appropriate control signals thereto.

The processor 40 may also process the pedal position signal to function the relay 44. For example, as discussed above, the pedal position signal may include an indication of the status of the limit switch 28. In such embodiments, the processor 40 may identify the status of the limit switch 28 based on the pedal position signal and function the relay 44 to correspond to the position of the limit switch 28. Such a configuration enables the control system 10 to be used with welding systems that require both a variable pedal position input and a limit switch input (ground common or positive common).

For example, when the pivotable housing 20 is at least partially pivoted, the limit switch 28 may close to provide the limit switch position signal, which may be represented by the transmitted pedal position signal. The processor 40 may process the pedal position signal to determine that the limit switch 28 is closed and provide an appropriate signal to the relay 44 to close the relay 44. Thus, the relay 44 may mimic the functionality provided by limit switches included within conventional cabled control devices. Signals provided by the relay 44 may be represented by the processed pedal position signal provided to the welding system 12 through the connector 42.

The transmitter 24 may transmit signals for reception by the receiver 16 at any interval. In some embodiments where digital radio methods are employed, a packet corresponding to the pedal position signal is transmitted about every 50 ms. However, the control system 10 may be operable to vary this transmission rate to increase or decrease system latency. For example, system latency may be reduced by increasing the rate at which the packets are transmitted. Alternatively, to reduce power consumption by the foot pedal 14 and receiver 16, the rate at which the packets are transmitted may be reduced.

The processor 40 may also provide other signal processing functions. For example, the processor 40 may process the pedal position signal to ensure that the pedal position signal is authentic and not an interfering signal transmitted by a device other than the foot pedal 14. For example, the processor 40 may be provided with a unique identifier, channel information, network information, and/or other communication information to correspond to the communication information provided to the transmitter 24. In some embodiments, the processor 40 may be reprogrammable to enable the operator to provide selected communication and control information to the processor 40.

For example, the receiver 16 may include a receiver programming interface 46, such as a USB, RS-232, or other wired or wireless data interface, associated with the processor 40 to enable the operator to reprogram and/or otherwise communicate with the processor 40. For example, the processor 40 may be programmed to process the pedal position signal in any desired manner before the signal is provided to the welding system 12 through the connector 42. The processor 40 may also programmed with the communication information discussed above. For example, in some embodiments, the foot pedal 14 may be one of several remote devices associated with the welding system 12 and the communication information enables the transmitter 24 and receiver 16 to communicate without significantly interfering with the other remote devices. The receiver 16 may also be configured to receive control signals from remote devices other than the foot pedal 14.

The processor 40 may include any elements or combination of elements operable to perform the various functions discussed herein. For example, the processor 40 may include a computing device, a microprocessor, a microcontroller, a programmable logic device, a digital signal processor, analog or digital logic, combinations thereof, and the like. In some embodiments, the processor 40 may include or be coupled with an analog-to-digital converter, digital-to-analog converter, and other signal processing elements.

The connector 42 is coupled with the processor 40 and operable to connect with the electrical control interface 18 associated with the welding system 12 to provide the processed pedal position signal thereto. In embodiments where the electrical control interface 18 provides an interface for a wired foot pedal, the connector 42 may mimic the configuration of the connector utilized by the wired foot pedal to enable the control system 10 to easily replace the wired foot pedal. Thus, in some embodiments, the connector 42 may present a standard electrical interface for connecting with the electrical control interface 18 of the welding system 12.

In some embodiments, the connector 42 may present a universal interface to connect with electrical control interfaces associated with a plurality of welding systems to enable the control system 10 to function in a variety of environments. However, as the welding systems may each present different electrical interface configurations, the connector 42 may be adaptable by the operator to conform to a desired electrical interface configuration. For example, the connector 42 may include a connector base 42*a* connected with the processor 40 and a plurality of interface harnesses 42*b* corresponding to a plurality of electrical interfaces utilized by different welding systems. Each interface harness 42*b* is operable to interchangeably mate with the connector base 42*a* to enable the receiver 16 to couple with varying electrical interfaces. However, in some embodiments, the connector 42 may present a fixed electrical interface or be replaceable with other connectors to facilitate coupling with the welding system 12.

The connector 42 may also enable the receiver 16 and its various components to be powered by the welding system 12 by receiving an electrical signal from the welding system 12. In some embodiments, the receiver 16 may include power conditioning circuitry to enable it to be powered by welding systems that present varying voltages and currents. Utilization of the connector 42 to receive power enables the receiver 16 to be compactly configured without requiring an internal power source such as a battery or battery pack. However, in some embodiments, the receiver 16 may include an internal power source to function independent of any power provided by the welding system 12 through the connector 42.

Further, the receiver 16 may receive other signals from the welding system 12 through the connector 42. For example, the receiver 16 may be adapted to receive control, configuration, and/or command signals from the welding system 12 to dictate how the pedal position signal is to be received by the receiver 16 and/or processed and provided to the welding system 12. Thus, for instance, the receiver 16 may receive communication information from the welding system 12 to facilitate its communication with the foot pedal 14.

In some embodiments, the receiver 16 may include one or more indicators 48 coupled with the processor 40 and operable to indicate the status the receiver 16. For example, the indicators 48 may be operable to indicate the status of the pedal position signal such as by illuminating while the receiver 16 is receiving the pedal position signal from the foot pedal 14. The indicators 48 may also indicate the status of the connection with the welding system 12, such as by illuminating when the connector 42 is properly connected to the electrical control interface 18. In some embodiments, the processor 40 may identify the status of the power source 30 of the foot pedal 14 utilizing the pedal position signal and the indicators 48 may indicate the power source status to inform and alert the operator. The indicators 48 may include various indicating elements such as LEDs, seven segment displays, LCD monitors, speakers, combinations thereof, and the like.

The control system 10 may be configured to reduce the lag time between operation of the foot pedal 14 and the output provided by the welding system 12. For example, the transmitter 24 may be configured to transmit the pedal position signal with a stop command after the foot pedal 14 is returned to its rest position to enable the receiver 16 to identify that the foot pedal 14 is at rest and immediately provide the appropriate signal to the welding system 12 to halt operation. Alternatively, to increase lag time, the transmitter 24 may stop transmitting as soon as the foot pedal 14 returns to the rest position such that the receiver 16 holds the pedal position associated with the last received pedal position signal for a short time until it is determined that the transmitter 24 has stopped transmitting.

In operation, the operator may connect the receiver 16 to the welding system 12. For example, the operator may connect the connector 42 with the electrical control interface 18 of the welding system 12. In some embodiments, the operator may select one of the harnesses 42*b* for coupling with the connector base 42*a* to enable the connector 42 to properly mate with the electrical control interface 18. The operator may position the foot pedal 14 in any desirable location and function the foot pedal 14 by pivoting the pivotable housing 20. The sensing element 22 senses the position of the pivotable housing 20 and the transmitter 24 transmits the pedal position signal to the receiver 16. The processor 40 processes the received pedal position signal, such as by decoding and/or scaling the signal, and the processed signal is provided to the welding system 12 using the connector 42. The welding system 12 utilizes the received signal to control its operation, such as by varying its welding current in response to the pedal position. Thus, the operator may continuously control the operation of the welding system 12 by changing the position of the pivotable housing 20.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

FIGS. 10-13 illustrate various internal elements of the foot pedal 14. The sensing element 22 is fixedly coupled with a pinion 50, which engages a rack 52. The rack 52 includes a pair of opposed, outwardly-opening arcuate grooves 54 that slidingly engage a corresponding pair of opposed, inwardly-facing arcuate rails 56 that form part of a receiving bracket 58 that is integral with or attached to the pivoting portion 20*b*. A torsion spring 60 engages a floor of the base portion 20*a* and the rack 52, biasing the rack 52 into the receiving bracket 58. A second access port 62 is proximate the torsion spring 60 and the rack 52 and grants access to the spring 60 and rack 52.

The rack 52 and pinion 50 may be formed from various materials, including metals, plastics, combinations thereof, and the like. In some embodiments, the rack 52 and pinion 50 may be comprised of aluminum, steel, or other similar materials to provide rigidity and stability. In an exemplary implementation, the rack 52 and pinion 50 are formed of a plastic impregnated with a lubricant, such as LNP RFL-4536 or similar materials.

The second access port 62 facilitates assembly of the foot pedal 14 during, for example, original manufacture or repair operations. In particular, the second access port 62 can be used to engage the rack 52 with pinion 50 in a desired manner when the base portion 20*a* and the pivoting portion 20*b* are interconnected. A user compresses the spring 60 via the access port 62 so that the spring 60 is in the position illustrated in FIG. 12. With the spring 60 thus compressed, the pinion 50 is rotated to a completely opened position or to a completely closed position, and the rack 52 is placed into engagement with the pinion 50 and in contact with the spring 60. The pivoting portion 20*b* is then attached to the base portion 20*a*, wherein the receiving bracket 58 of the pivoting portion 20*b* slides into engagement with the rack 52. When the user releases the spring 60, the spring 60 biases the rack 52 against a top wall of the pivoting portion 20*b*, wherein the grooves 54 of the rack 52 are engaged with the rails 56 of the receiving bracket 58.

Figure 12:
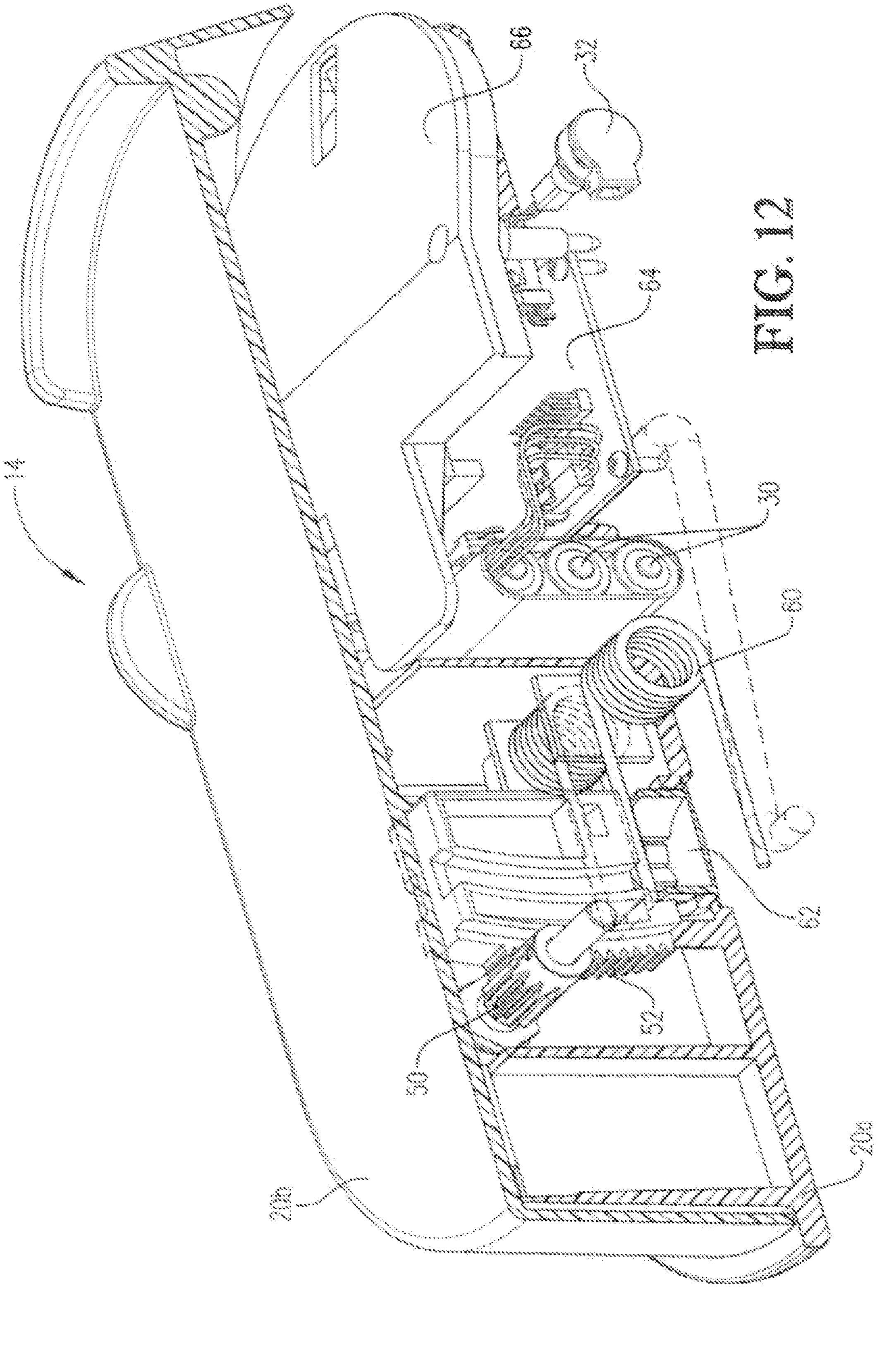
FIG. 12 is a sectional view of the foot pedal of FIGS. 1-5 illustrating the pivoting portion in a second position relative to the base portion.

A circuit board 64 may house various electrical components including the processor 40, the antenna 38, and the transmitter programming interface 34. A shield 66 generally protects the internal components of the foot pedal from dust and debris during use of the system 10. As illustrated in FIG. 12, a gap between the base portion 20*a* and the pivoting portion 20*b* leave one or more internal components of the foot pedal 14 exposed to the external environment in certain positions. The shield 66 is interposed between the internal electrical components and the gap to prevent dust or debris breaching the gap from contacting the electrical component.

The shield 66 may be formed from various materials, including metals, plastics, combinations thereof, and the like. In some embodiments, the shield 66 may be comprised of aluminum, steel, or other similar materials to provide rigidity and stability. Alternatively, the shield 66 may be comprised of poly carbonate or other fiber materials to minimize interference with signals generated by the transmitter 24. In an exemplary implementation, the shield 66 is formed of a medium impact blended polymer, such as ABS (Acrylinitrile Butadiene Styrene) with anti-static properties to minimize the risk of undesirable electrical through one or more of the electrical components. By way of example, the shield 66 may be formed of CYCOLAC FR15 or similar materials.

The first access port 36 may provide access to the transmitter programming interface 34 or other internal components for purposes of programming the processor 40 or other components. As explained above, the transmitter programming interface 34 may include a rotary encoder or similar component for adjusting a frequency of communication signals transmitted between the foot pedal 14 and the receiver 16. The transmitter programming interface 34 may be placed on the circuit board 64 proximate the first access port 36 so that a user can actuate or connect to the transmitter programming interface 34 via the first access port 36.

Although the present technology has been described with reference to the preferred embodiments illustrated in the attached drawings, it is noted that equivalents may be employed and substitutions made herein without departing from the scope of the subject matter recited in the claims. It will be appreciated, for example, that either one of the rack 52 or the receiving bracket 58 may include a groove and the other a rail to enable sliding engagement between the rack 52 and the receiving bracket 58.

Having thus described preferred implementations of the present technology, what is claimed as new and desired to be protected by Letters Patent includes the following:

1. A wireless foot pedal controller for a welding system comprising:

a housing including a first portion and a second portion moveably attached to said first portion so as to define a plurality of pivot positions between said first portion and said second portion, said first portion supporting said wireless foot pedal controller relative to an external surface, said first portion adjustable between a plurality of elevated positions and a collapsed position, wherein a first end of said first portion is elevated relative to a second end of said first portion when said first portion is in said elevated position;

a sensing element for sensing a position of said second portion relative to said first portion and providing a corresponding position signal; and a transmitter coupled with said sensing element for wirelessly transmitting said position signal to a receiver of a welder, the position signal controls the welding current of the welding system; and an elevator element moveable between a stowed position corresponding to said collapsed position and a plurality of deployed positions, each deployed position corresponding to one of said plurality of elevated positions of said wireless foot pedal controller.

2. The wireless foot pedal controller as set forth in claim 1, wherein said elevator element includes a substantially U-shaped bracket in pivotal engagement with said first portion and moveable between said stowed position and said deployed position, and wherein said first portion includes a substantially U-shaped channel for receiving said U-shaped bracket when said bracket is in said stowed position.

3. The wireless foot pedal controller as set forth in claim 1, said housing further comprising any one of weights, flared surfaces, anti-skid elements, surface fasteners and coupling elements such that the first portion remains stationary relative to said external surface.

4. The wireless foot pedal controller as set forth in claim 1, further comprising:

an intermediate element for actuating said sensing element, said intermediate element in sliding engagement with said second portion of said housing; and a spring element for biasing said intermediate against said pivoting portion of said housing.

5. The wireless foot pedal controller as set forth in claim 1, wherein said housing is constructed at least in part of a long fiber plastic material including glass fibers.

6. The wireless foot pedal controller as set forth in claim 1, wherein said long fiber plastic material comprises between 10% and 50% glass fibers.

7. The wireless foot pedal controller as set forth in claim 1, further comprising:

a limit switch, the limit switch operable to function when said second portion is at least partially moved relative to said first portion, wherein said position signal includes a status of said limit switch.

8. The wireless foot pedal controller as set forth in claim 3, wherein said first portion defines a base for housing said sensing element and transmitter.

9. The wireless foot pedal controller as set forth in claim 4, wherein said first portion of said housing defines an access port proximate said spring element for granting access to said spring element via said access port.

10. A wireless foot pedal controller for a welding system comprising:

a housing with a base portion and a pivoting portion pivotable relative to said base portion so as to define a plurality of pivot positions between said base portion and said pivoting portion, said base portion of said wireless foot pedal controller including an elevator element defining a plurality of deployed positions, said elevator element supports a first end of said base portion in an elevated position relative to a second end of said base portion such that each deployed position defines a unique elevated position of said wireless foot pedal controller;

a rotary potentiometer for providing a plurality of position signals of the pivoting portion relative to the base portion for each deployed position in the plurality of deployed positions;

a pinion coupled with said rotary potentiometer;

a rack in intermeshing engagement with said pinion and in sliding engagement with said pivoting portion of said housing;

a spring element for biasing said rack against said pivoting portion of said housing; and a transmitter coupled with said rotary potentiometer for wirelessly transmitting said position signal, wherein the position signal controls the welding current of the welding system.

11. The wireless foot pedal controller as set forth in claim 10, wherein said spring element includes a torsion spring engaging said base and said rack and biasing said rack against said pivoting portion of said housing.

12. The wireless foot pedal controller as set forth in claim 10, wherein said pivoting portion of said housing includes a guide channel and said rack includes an elongated guide track in mating engagement with said guide channel.

13. The wireless foot pedal controller as set forth in claim 10, said base portion further comprising any one of weights, flared surfaces, anti-skid elements, surface fasteners and coupling elements such that the first portion remains stationary relative to an external surface.

14. The wireless foot pedal controller as set forth in claim 10, wherein said housing is constructed at least in part of a long fiber plastic material including glass fibers.

15. The wireless foot pedal controller as set forth in claim 10, wherein said long fiber plastic material comprises between 10% and 50% glass fibers.

16. The wireless foot pedal controller as set forth in claim 10, further comprising:

a limit switch, the limit switch operable to function when said pivoting portion is at least partially pivoted relative to said base portion, wherein said position signal includes a status of said limit switch.

17. The wireless foot pedal controller as set forth in claim 11, wherein said base portion of said housing defines an access port proximate said torsion spring for granting access to said torsion spring through said base portion.

18. The wireless foot pedal controller as set forth in claim 13, wherein said base portion houses said rotary potentiometer and said transmitter.

19. A wireless control system for a welding system including an electrical control interface, the wireless control system comprising:

a foot pedal presenting a first end and a second end, said foot pedal including a pivotable portion defining a plurality of pivot positions, a sensing element coupled with said pivotable portion and operable to sense a position of said pivotable portion and provide a corresponding pedal position signal, a transmitter coupled with said sensing element and operable to wirelessly transmit said pedal position signal, and an elevator element moveable between a stowed position and a plurality of deployed positions, wherein said elevator element supports said first end of said foot pedal in an elevated position relative to said second end such that each deployed position defines a unique elevated position of said foot pedal; and a receiver including— an antenna operable to wirelessly receive the pedal position signal generated by the foot pedal, a processor coupled with the antenna and operable to process the received pedal position signal, and a connector coupled with the processor and operable to connect with the electrical control interface associated with the welding system to provide the processed pedal position signal thereto, wherein the pedal position signal controls the welding current of the welding system.

20. The wireless control system as set forth in claim 19, said foot pedal further comprising:

a limit switch, the limit switch operable to function when said pivotable portion is at least partially pivoted, wherein said pedal position signal includes a status of said limit switch.

* * * * *